(12) United States Patent
Rajan

(10) Patent No.: US 7,184,483 B2
(45) Date of Patent: Feb. 27, 2007

(54) TECHNIQUE FOR EMULATING DIFFERENTIAL SIGNALING

(75) Inventor: Suresh Rajan, San Jose, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 11/326,343

(22) Filed: Jan. 6, 2006

(65) Prior Publication Data

US 2006/0115004 A1 Jun. 1, 2006

Related U.S. Application Data

(63) Continuation of application No. 09/983,412, filed on Oct. 24, 2001, now Pat. No. 6,999,516.

(51) Int. Cl.
*H04B 14/06* (2006.01)

(52) U.S. Cl. ...................................... 375/244

(58) Field of Classification Search ................ 375/244, 375/253, 240.23, 240.27, 257, 341; 326/63, 326/64, 65
See application file for complete search history.

(56) References Cited

U.S. PATENT DOCUMENTS

| | | |
|---|---|---|
| 5,740,201 A | 4/1998 | Hui |
| 6,137,455 A | 10/2000 | Duo |
| 6,154,498 A | 11/2000 | Dabral et al. |
| 6,278,740 B1 | 8/2001 | Nordyke |
| 6,999,516 B1 * | 2/2006 | Rajan .................... 375/244 |
| 2001/0038641 A1 * | 11/2001 | Fujimori et al. ........... 370/468 |

OTHER PUBLICATIONS

A. X. Widmer, et al., "A DC-Balanced, Partiioned-Block, 8B/10B Transmission Code", IBM J. Res. Develop., vol. 27, No. 5, p. 440-451, Sep. 1983.

* cited by examiner

*Primary Examiner*—Khai Tran
(74) *Attorney, Agent, or Firm*—Hunton & Williams LLP

(57) ABSTRACT

A technique for emulating differential signaling is disclosed. In one exemplary embodiment, the technique is realized by encoding a plurality of input signals so as to generate a plurality of encoded signals having a spatial run length of N, wherein N is an integer having a value of at least two. Each of the plurality of encoded signals is then transmitted over a transmission medium so as to provide a respective plurality of transmitted encoded signals. Each of the plurality of transmitted encoded signals is then compared with at least N neighboring others of the plurality of transmitted encoded signals so as to recover a representation of each of the plurality of encoded signals. Each of the plurality of recovered encoded signals is then decoded so as to generate a plurality of decoded signals representing the plurality of input signals.

22 Claims, 12 Drawing Sheets

| X | Y1 | Y2 | $I_{XP}$ | $I_{YP}$ | $I_{XN}$ | $I_{YN}$ | $I_{XN}+I_{YP}$ | $I_{XP}+I_{YN}$ | $V_{OUT}$ |
|---|----|----|----------|----------|----------|----------|-----------------|-----------------|-----------|
| 0 | 0  | 1  | ½        | ½        | 0        | 1        | ½               | 3½              | 0V        |
| 0 | 1  | 0  | ½        | ½        | 0        | 1        | ½               | 3½              | 0V        |
| 0 | 1  | 1  | 1        | 0        | 0        | 1        | 0               | 2I              | 0V        |
| 1 | 0  | 0  | 0        | 1        | 1        | 0        | 2I              | 0               | $V_{DD}$  |
| 1 | 0  | 1  | 0        | 1        | ½        | ½        | 3½              | ½               | $V_{DD}$  |
| 1 | 1  | 0  | 0        | 1        | ½        | ½        | 3½              | ½               | $V_{DD}$  |

Figure 4

Possible Neighbors For Each Signal To Be Recovered

| Signal | Neighbors (SRL = 2) | Neighbors (SRL = 3) |
|---|---|---|
| a' | [b' c'] | [b' c' d'] |
| b' | [a' c'] | [a' c' d'] or [c' d' e'] |
| c' | [b' d'] | [a' b' d'] or [b' d' e'] |
| d' | [c' e'] | [a' b' c'] or [b' c' e'] |
| e' | [c' d'] | [b' c' d'] |

Figure 11

TECHNIQUE FOR EMULATING DIFFERENTIAL SIGNALING

CROSS-REFERENCE TO RELATED APPLICATIONS

This patent application is a continuation of U.S. patent application Ser. No. 09/983,412, filed Oct. 24, 2001 now U.S. Pat. No. 6,999,516, which is hereby incorporated by reference herein in its entirety.

FIELD OF THE DISCLOSURE

The present disclosure relates generally to signal transmission techniques and, more particularly, to a technique for emulating differential signaling.

BACKGROUND OF THE DISCLOSURE

Differential signaling has many advantages over single ended signaling: smaller signal swing, increased noise immunity, constant output drive current (i.e., di/dt=0 for output drive circuitry), and pattern independent propagation delay (i.e., $t_{pd}$ not pattern dependent). However, differential signaling requires a larger number of signal pins (~1.5× to 2×) than single ended signaling. This increased signal pin count needed for differential signaling becomes an issue with integrated circuits (IC's) that have a very wide input/output (I/O) interface. For example, memory controllers that have a 128-bit wide data interface to memory devices may require an additional 128 signal pins to implement full differential signaling. Thus, for IC's with a large number of data/address signal pins, differential signaling may be prohibitive in terms of signal pin count, packaging size, and cost.

In view of the foregoing, it would be desirable to provide a technique for obtaining some of the above-described advantages of differential signaling without realizing the above-described disadvantages associated with differential signaling.

SUMMARY OF THE DISCLOSURE

A technique for emulating differential signaling is disclosed. In one exemplary embodiment, the technique is realized by encoding a plurality of input signals so as to generate a plurality of encoded signals having a spatial run length of N, wherein N is an integer having a value of at least two. Each of the plurality of encoded signals is then transmitted over a transmission medium so as to provide a respective plurality of transmitted encoded signals. Each of the plurality of transmitted encoded signals is then compared with at least N neighboring others of the plurality of transmitted encoded signals so as to recover a representation of each of the plurality of encoded signals. Each of the plurality of recovered encoded signals is then decoded so as to generate a plurality of decoded signals representing the plurality of input signals.

In accordance with other aspects of this particular embodiment of the present disclosure, the plurality of encoded signals are transformed into the plurality of transmitted encoded signals when transmitted over the transmission medium. For example, this transformation may occur as a result of a driver driving the plurality of encoded signals onto a bus, and thereby adjusting the voltage level of one or more of the plurality of encoded signals, adjusting the current level of one or more of the plurality of encoded signals, or adjusting the timing of one or more of the plurality of encoded signals. Additionally, this transformation may occur as a result of one or more of: external noise, signal crosstalk, attenuation, and transmission line reflections.

In accordance with further aspects of this particular embodiment of the present disclosure, the N neighboring transmitted encoded signals which are nearest in spatial proximity to the encoded signal to be recovered may be determined by measuring spatial proximity where the plurality of input signals are encoded, along the transmission medium, and/or where the each of the plurality of transmitted encoded signals is compared.

In accordance with still further aspects of this particular embodiment of the present disclosure, the plurality of decoded signals represent the plurality of input signals by maintaining consistent logic values between the plurality of input signals and the plurality of decoded signals.

In accordance with still further aspects of this particular embodiment of the present disclosure, each of the plurality of transmitted encoded signals is preferably compared with two neighboring others of the plurality of transmitted encoded signals so as to recover a representation of each of the plurality of transmitted encoded signals.

In another exemplary embodiment of the present disclosure, the technique is realized as an improved method for encoding a plurality of input signals, wherein the improvement comprises encoding the plurality of input signals so as to generate a plurality of encoded signals having a spatial run length of at least two, wherein each particular one of the plurality of encoded signals has at least two neighboring others of the plurality of encoded signals such that at least one of the at least two neighboring others of the plurality of encoded signals is of a different polarity than the particular one encoded signal.

In still another exemplary embodiment of the present disclosure, the technique is realized as an improved method for recovering a plurality of encoded signals, wherein the plurality of encoded signals have a spatial run length of at least two, and wherein each particular one of the plurality of encoded signals has at least two neighboring others of the plurality of encoded signals such that at least one of the at least two neighboring others of the plurality of encoded signals is of a different polarity than the particular one encoded signal. The improvement comprises comparing each of the plurality of encoded signals with its at least two neighboring others of the plurality of encoded signals, such that each of the plurality of encoded signals is compared with the at least one of the at least two neighboring others of the plurality of encoded signals having the different polarity, thereby improving recovery of each of the plurality of encoded signals.

The present disclosure will now be described in more detail with reference to exemplary embodiments thereof as shown in the appended drawings. While the present disclosure is described below with reference to preferred embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings. These drawings should not be construed as limiting the present disclosure, but are intended to be exemplary only.

FIG. 4 shows a truth table for the example circuit shown in FIG. 3.

FIG. 11 is a table showing the sets of spatially adjacent neighbors for a spatial run length of two and a spatial run length of three for 5-bit output patterns (codes) in accordance with the present disclosure.

DETAILED DESCRIPTION OF EXEMPLARY EMBODIMENTS

Figure 1:
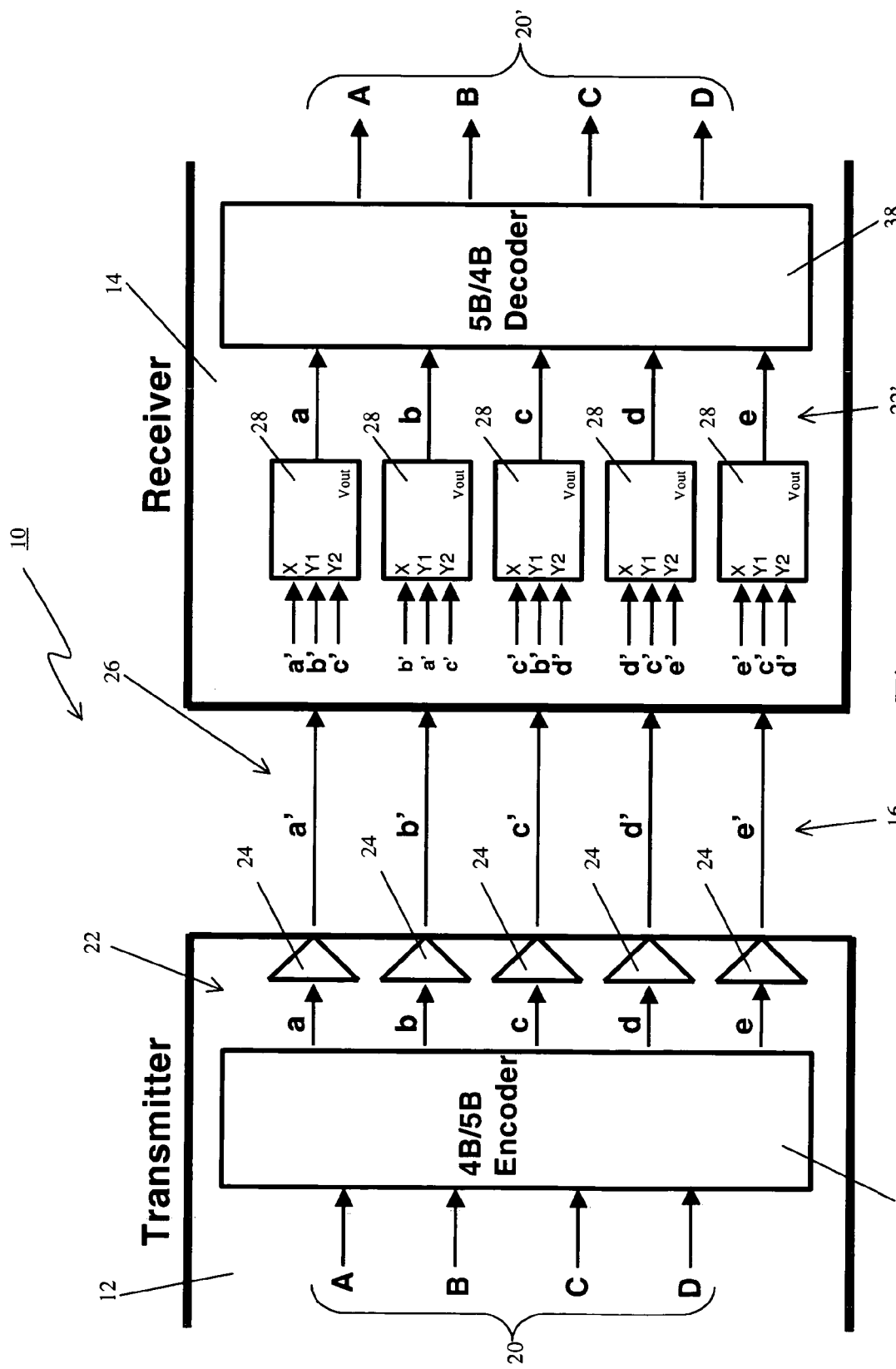
FIG. 1 shows a system for emulating differential signaling in accordance with the present disclosure.

Referring to FIG. 1, there is shown a system 10 for emulating differential signaling in accordance with the present disclosure. The system 10 emulates differential signaling in accordance with the present disclosure by obtaining at least some of the above-described advantages of differential signaling without actually generating traditional differential signals and thereby realizing the above-described disadvantages associated with differential signaling. The system 10 comprises a transmitter 12 and a receiver 14 interconnected by a plurality of electrically conductive signal paths 16.

At this point it should be noted that the system 10 may be encompassed within a single integrated circuit, or formed with several integrated or discrete circuits. For example, the transmitter 12 and the receiver 14 could each be an integrated circuit, and the plurality of electrically conductive signal paths 16 could be a plurality of transmission lines. More particularly, the transmitter 12 could be an integrated circuit central processing unit (CPU) device and the receiver 14 could be an integrated circuit memory controller device. Alternatively, either one or both of the transmitter 12 and the receiver 14 could be application specific integrated circuit (ASIC) devices. Alternatively still, the transmitter 12 could be an integrated circuit memory controller device (e.g., a double data rate (DDR) memory controller) and the receiver 14 could be an integrated circuit memory device (e.g., a DDR dynamic random access memory (DRAM)).

Referring again to FIG. 1, the transmitter 12 includes an encoder 18 for encoding a plurality of single ended input signals 20. Based upon each unique bit pattern of the plurality of single ended input signals 20, the encoder 18 generates a plurality of encoded output signals 22 having a respective unique output bit pattern. The encoder 18 is designed such that all of the output bit patterns have a spatial run length of two. That is, no more than two spatially adjacent bits in each of the output bit patterns can be of the same polarity. Thus, in the binary system 10 of FIG. 1, no more than two spatially adjacent bits in the output bit patterns formed by the plurality of encoded output signals 22 can be logic zero or logic one. Also, in the system 10 of FIG. 1, the plurality of single ended input signals 20 includes four single ended input signals (i.e., A, B, C, and D), and the plurality of encoded output signals 22 includes five encoded output signals (i.e., a, b, c, d, and e). Thus, in the system 10 of FIG. 1, the encoder 18 is a four-bit (4 B) to five-bit (5 B) encoder.

Figure 2:
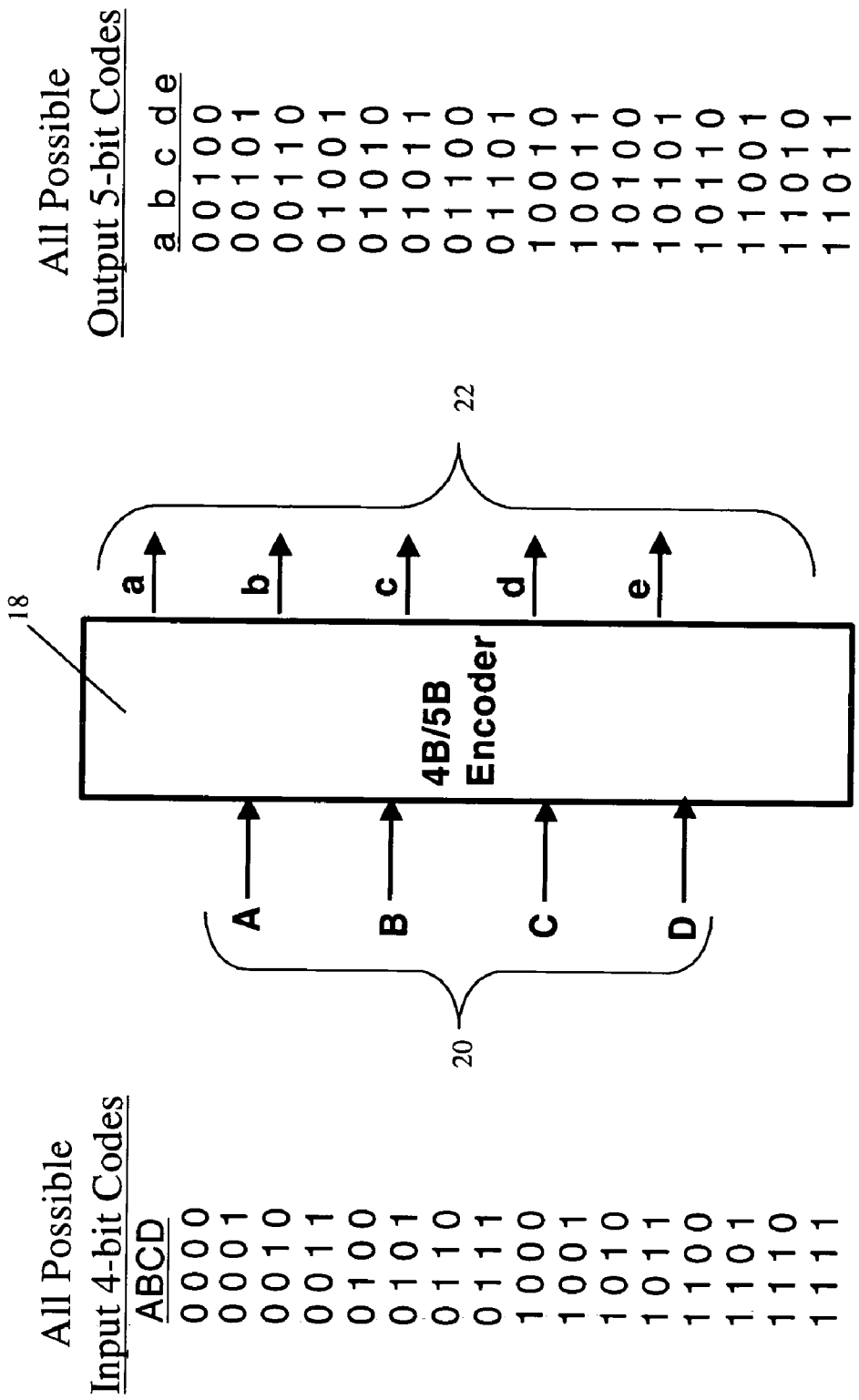
FIG. 2 shows example input and output code listings for the encoder shown in FIG. 1.

Referring to FIG. 2, there are shown example input and output code listings for the encoder 18 of FIG. 1. On the left side of FIG. 2, there is shown a listing of all possible input bit patterns (codes) for the plurality of single ended input signals 20 (i.e., input signals A, B, C, and D). On the right side of FIG. 2, there is shown a listing of all possible output bit patterns (codes) for the plurality of encoded output signals 22 (i.e., encoder output signals a, b, c, d, and e). For each of the output bit patterns (codes), there are no more than two spatially adjacent bits of the same polarity (i.e., all of the output bit patterns (codes) have a spatial run length of two). It should be noted that the listings of input and output codes shown in FIG. 2 are in no particular order (i.e., the input and output code listings orders may not reflect the actual mapping between the input and output codes).

Referring back to FIG. 1, the transmitter 12 has a plurality of line drivers 24 for transmitting the plurality of encoded output signals 22 (i.e., encoder output signals a, b, c, d, and e) onto the corresponding plurality of electrically conductive signal paths 16. The plurality of transmitted encoded output signals 26 (i.e., transmitted encoded output signals a', b', c', d', and e') are received at the receiver 14.

The plurality of encoded output signals 22 (i.e., encoder output signals a, b, c, d, and e) that are transmitted onto the corresponding plurality of electrically conductive signal paths 16 are typically transformed in some manner to produce the plurality of transmitted encoded output signals 26 (i.e., transmitted encoded output signals a', b', c', d', and e'). For example, the plurality of line drivers 24 may transform the plurality of encoded output signals 22 (i.e., encoder output signals a, b, c, d, and e) by adjusting the voltage level of one or more of the plurality of encoded output signals 22, adjusting the current level of one or more of the plurality of encoded output signals 22, and/or adjusting the timing of one or more of the plurality of encoded output signals 22. Also, the plurality of electrically conductive signal paths 16 could be a data bus for carrying the plurality of encoded output signals 22 (i.e., encoder output signals a, b, c, d, and e) in close proximity. In such a case, the plurality of encoded output signals 22 (i.e., encoder output signals a, b, c, d, and e) that are transmitted onto the data bus could be transformed due to external noise, signal crosstalk, attenuation, and/or transmission line reflections associated with the data bus. In any case, the plurality of encoded output signals 22 (i.e., encoder output signals a, b, c, d, and e) are transformed in some manner into the plurality of transmitted encoded output signals 26 (i.e., transmitted encoded output signals a', b', c', d', and e') so as to require recovery of the plurality of encoded output signals 22 (i.e., encoder output signals a, b, c, d, and e) at the receiver 14.

The receiver 14 includes a plurality of three-bit comparators 28 for recovering each of the plurality of encoded output signals 22 (i.e., encoded output signals a, b, c, d, and e) from the plurality of transmitted encoded output signals 26 (i.e., transmitted encoded output signals a', b', c', d', and e') that are received at the receiver 14. Each three-bit comparator 28 operates to recover a respective one of the plurality of encoded output signals 22 (i.e., encoded output signals a, b, c, d, or e) by comparing a respective one of the plurality of transmitted encoded output signals 26 (e.g., transmitted encoded output signal b') with its two nearest neighboring transmitted encoded output signals 26 (e.g., transmitted encoded output signals a' and c'). Since, as described above, no more than two spatially adjacent bits in each of the output bit patterns can be of the same polarity, at least one of the neighboring bits will have a different polarity from the bit being recovered. That is, if the bit to be recovered is a logic zero, then at least one of the neighboring bits will be a logic one, and vice versa. Thus, each three-bit comparator 28 compares a respective one of the plurality of transmitted encoded output signals 26 (e.g., transmitted encoded output signal b') with at least one neighboring transmitted encoded output signal 26 (e.g., transmitted encoded output signals a' or c') of opposite polarity so as to recover a respective one of the plurality of encoded output signals 22 (e.g., encoded output signal b).

At this point it should be noted that the point at which neighboring bits are measured to determine which neighboring bits are in fact spatially adjacent neighboring bits may be at the transmitter 12, the plurality of electrically conductive signal paths 16, and/or the receiver 14.

Figure 3:
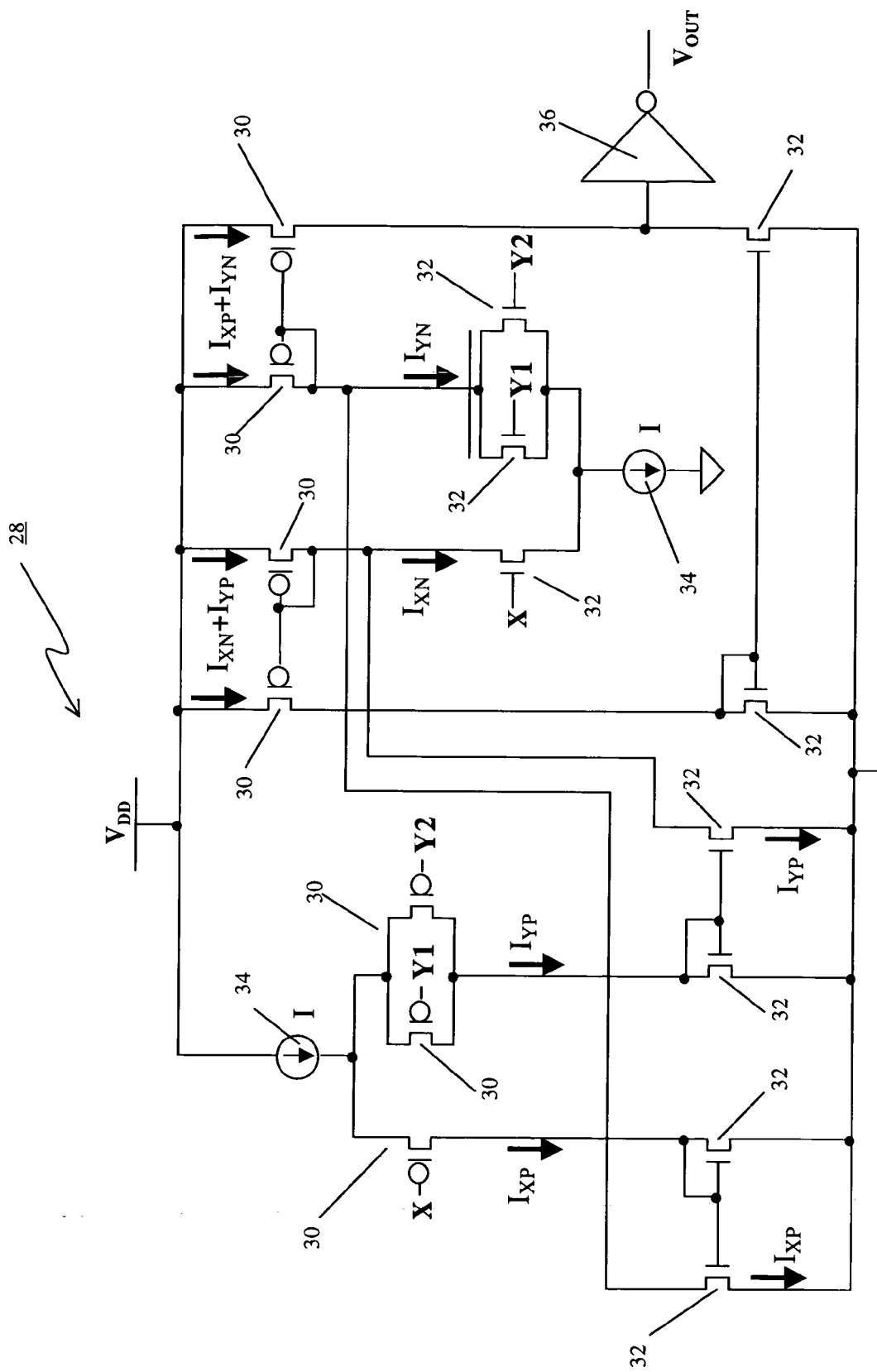
FIG. 3 shows a schematic diagram of an example circuit of one of the plurality of three-bit comparators shown in FIG. 1.

Referring to FIG. 3, there is shown a schematic diagram of an example circuit of one of the plurality of three-bit comparators 28. The circuit comprises a plurality of PMOS transistors 30, a plurality of NMOS transistors 32, a pair of constant current devices 34, and an inverting output driver 36. FIG. 4 shows a truth table for the circuit shown in FIG. 3. As can be seen from the truth table of FIG. 4, the three-bit comparator 28 recovers an encoded output signal 22 by comparing a corresponding transmitted encoded output signal 26 (i.e., circuit input X) with its two nearest neighboring transmitted encoded output signals (i.e., circuit inputs Y1 and Y2), at least one of which is always of a different polarity from the transmitted encoded output signal 26 being recovered.

Referring back to FIG. 1, the receiver 14 also includes a decoder 38 for decoding the plurality of recovered encoded output signals 22' (i.e., recovered encoded output signals a, b, c, d, and e). The decoder 38 operates similar to the encoder 18, but in reverse. That is, based upon each unique bit pattern of the plurality of recovered encoded output signals 22' (i.e., recovered encoded output signals a, b, c, d, and e), the decoder 38 generates a plurality of decoded single ended output signals 20' (i.e., decoded output signals A, B, C, and D) having a respective unique output bit pattern which matches the bit pattern of the original plurality of single ended input signals 20 (i.e., input signals A, B, C, and D). In the system 10 of FIG. 1, the plurality of recovered encoded output signals 22' includes five recovered encoded output signals (i.e., recovered encoded output signals a, b, c, d, and e), and the plurality of decoded single ended output signals 20' includes four decoded single ended output signals (i.e., A, B, C, and D). Thus, in the system 10 of FIG. 1, the decoder 38 is a five-bit (5 B) to four-bit (4 B) decoder.

Figure 5:
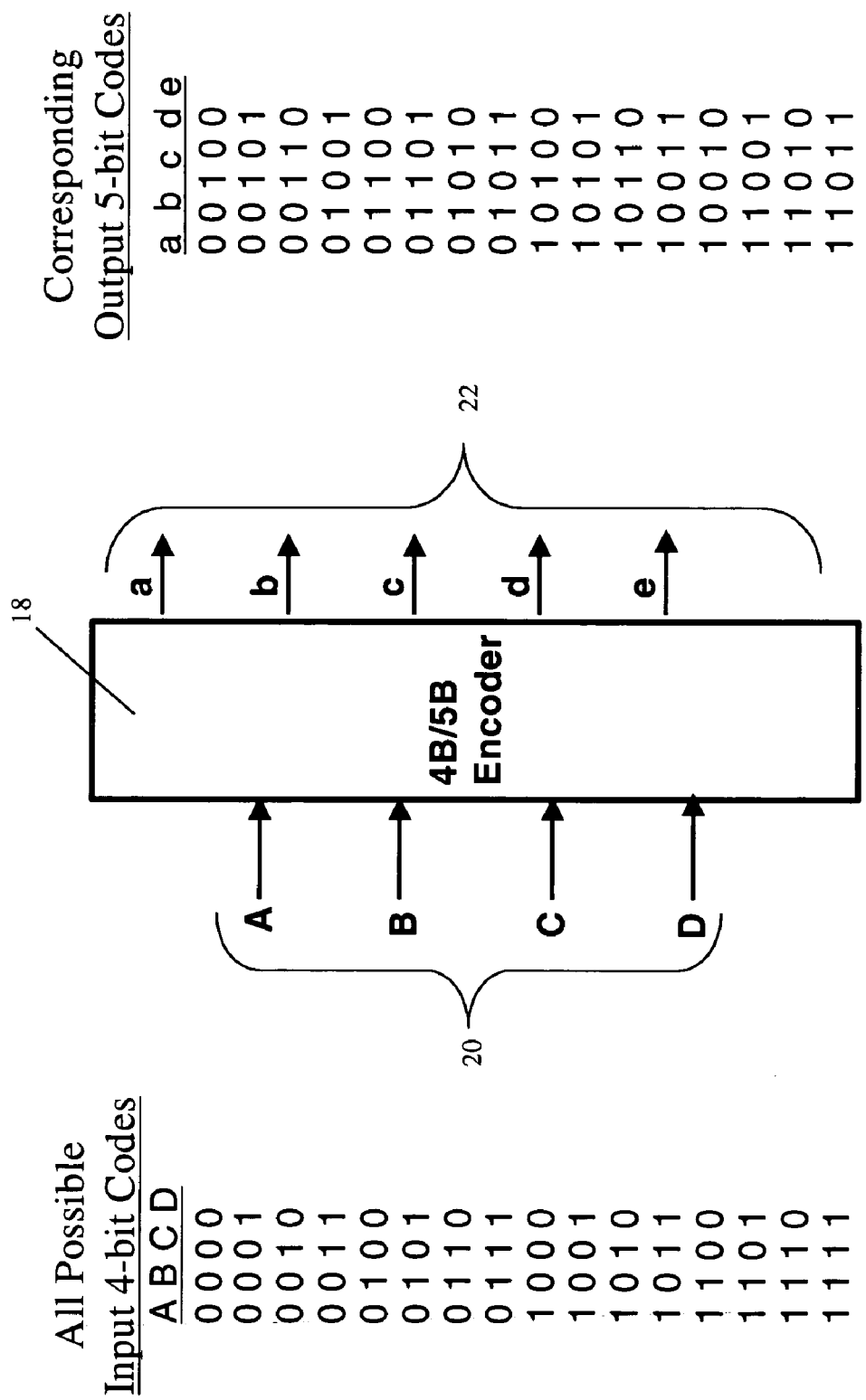
FIG. 5 shows a mapping between input patterns (codes) and output patterns (codes) for the four-bit to five-bit encoder shown in FIG. 1.

At this point it should be noted that there are several possible implementations of the encoder 18 and the decoder 38, depending upon the particular mapping selected between input and output codes. For example, FIG. 5 shows one particular mapping between input patterns (codes) and output patterns (codes) for the four-bit to five-bit encoder 18. On the left side of FIG. 5, there is shown a listing of all possible input bit patterns (codes) for the plurality of single ended input signals 20 (i.e., input signals A, B, C, and D). On the right side of FIG. 5, there is shown a particular listing of corresponding output bit patterns (codes) for the plurality of encoded output signals 22 (i.e., encoder output signals a, b, c, d, and e). As with the output bit patterns (codes) of FIG. 2, for each of the output bit patterns (codes) of FIG. 5, there are no more than two spatially adjacent bits of the same polarity (i.e., all of the output bit patterns (codes) have a spatial run length of two).

Figure 6:
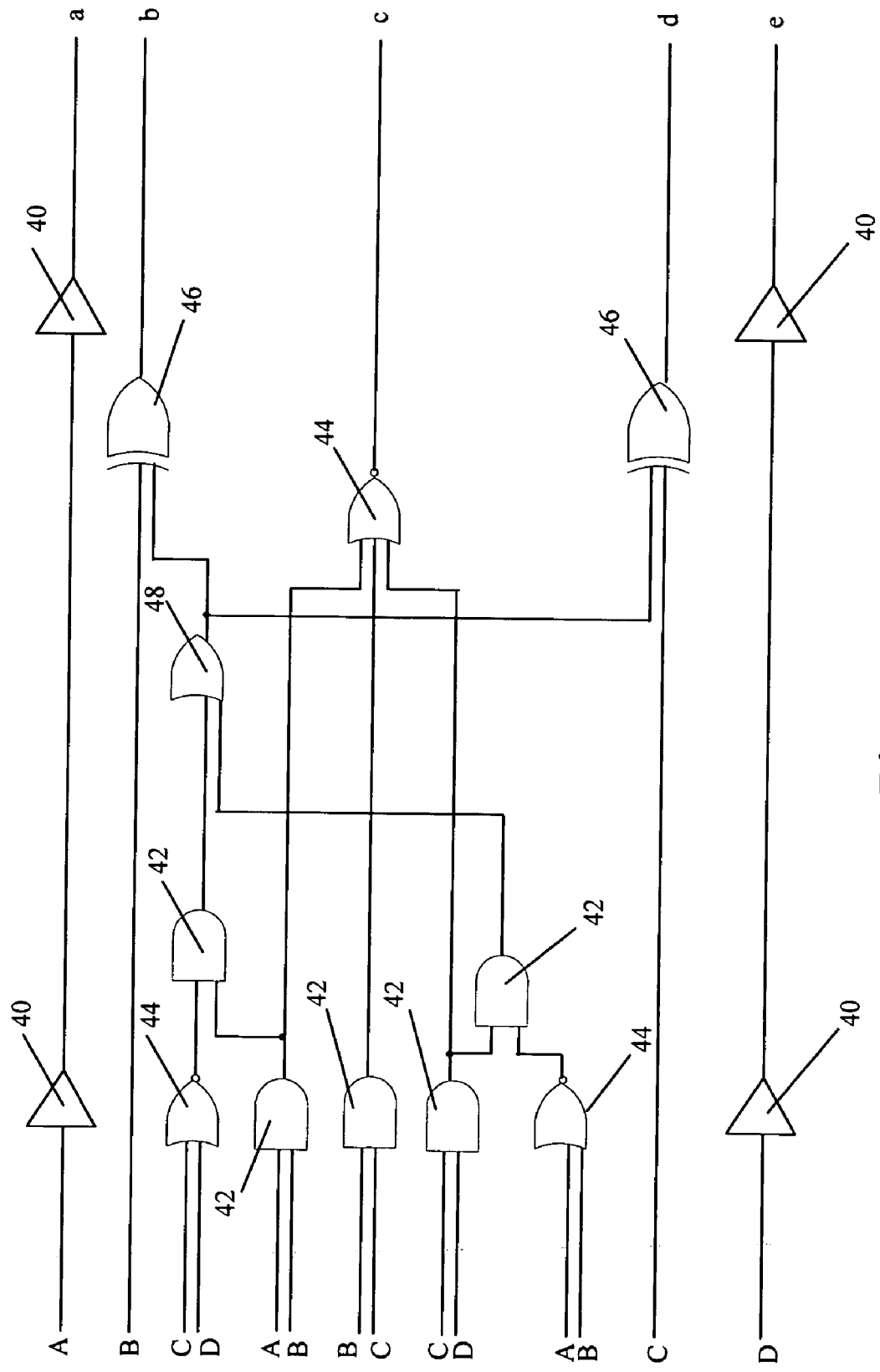
FIG. 6 shows a schematic diagram of circuitry for an encoder for realizing the mapping shown in FIG. 5.

Referring to FIG. 6, there is shown a schematic diagram of circuitry for the encoder 18 for realizing the mapping shown in FIG. 5. The encoder circuitry of FIG. 6 comprises a plurality of buffers 40, a plurality of AND gates 42, a plurality of NOR gates 44, a plurality of exclusive OR gates 46, and an OR gate 48 for performing the encoding operation in the encoder 18. It should be noted that the buffers 40 are provided primarily for matching propagation delay times of other encoder circuitry (i.e., the logic circuitry).

Figure 7:
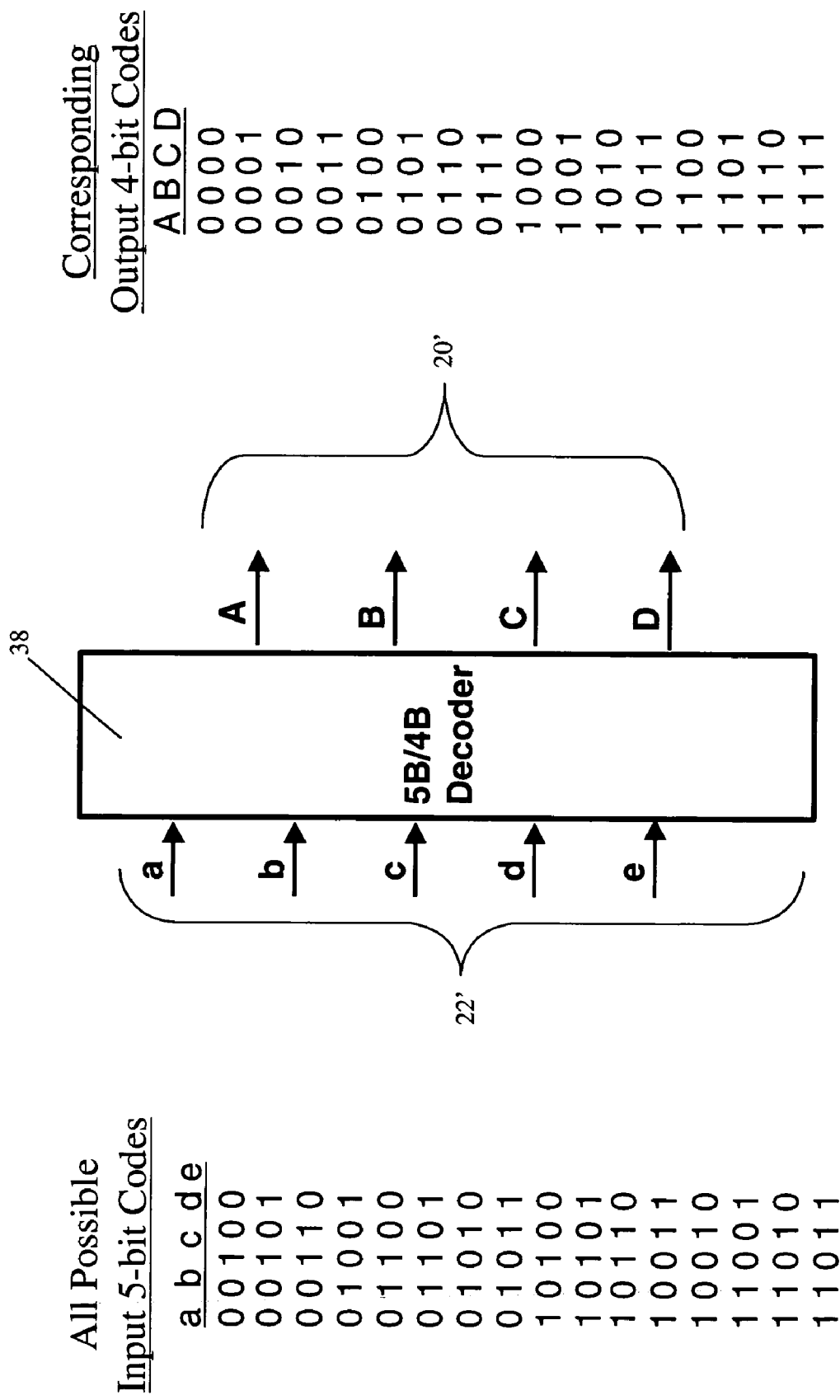
FIG. 7 shows a mapping between input patterns (codes) and output patterns (codes) for the five-bit to four-bit decoder shown in FIG. 1.

Referring to FIG. 7, there is shown a mapping between input patterns (codes) and output patterns (codes) for the five-bit to four-bit decoder 38. The mapping shown in FIG. 7 corresponds to the mapping shown in FIG. 5, only in reverse. On the left side of FIG. 7, there is shown a listing of all possible input bit patterns (codes) for the plurality of recovered encoded output signals 22' (i.e., recovered encoded output signals a, b, c, d, and e). This listing of all possible input bit patterns (codes) for the plurality of recovered encoded output signals 22' (i.e., recovered encoded output signals a, b, c, d, and e) matches the particular listing of corresponding output bit patterns (codes) for the plurality of encoded output signals 22 (i.e., encoder output signals a, b, c, d, and e) in FIG. 5. Thus, as with the output bit patterns (codes) of FIG. 5, for each of the input bit patterns (codes) of FIG. 7, there are no more than two spatially adjacent bits of the same polarity (i.e., all of the input bit patterns (codes) have a spatial run length of two).

On the right side of FIG. 7, there is shown a particular listing of corresponding output bit patterns (codes) for the plurality of decoded single ended output signals 20' (i.e., output signals A, B, C, and D). This listing of corresponding output bit patterns (codes) for the plurality of decoded single ended output signals 20' (i.e., output signals A, B, C, and D) matches the listing of all possible input bit patterns (codes) for the plurality of single ended input signals 20 (i.e., input signals A, B, C, and D) in FIG. 5.

Figure 8:
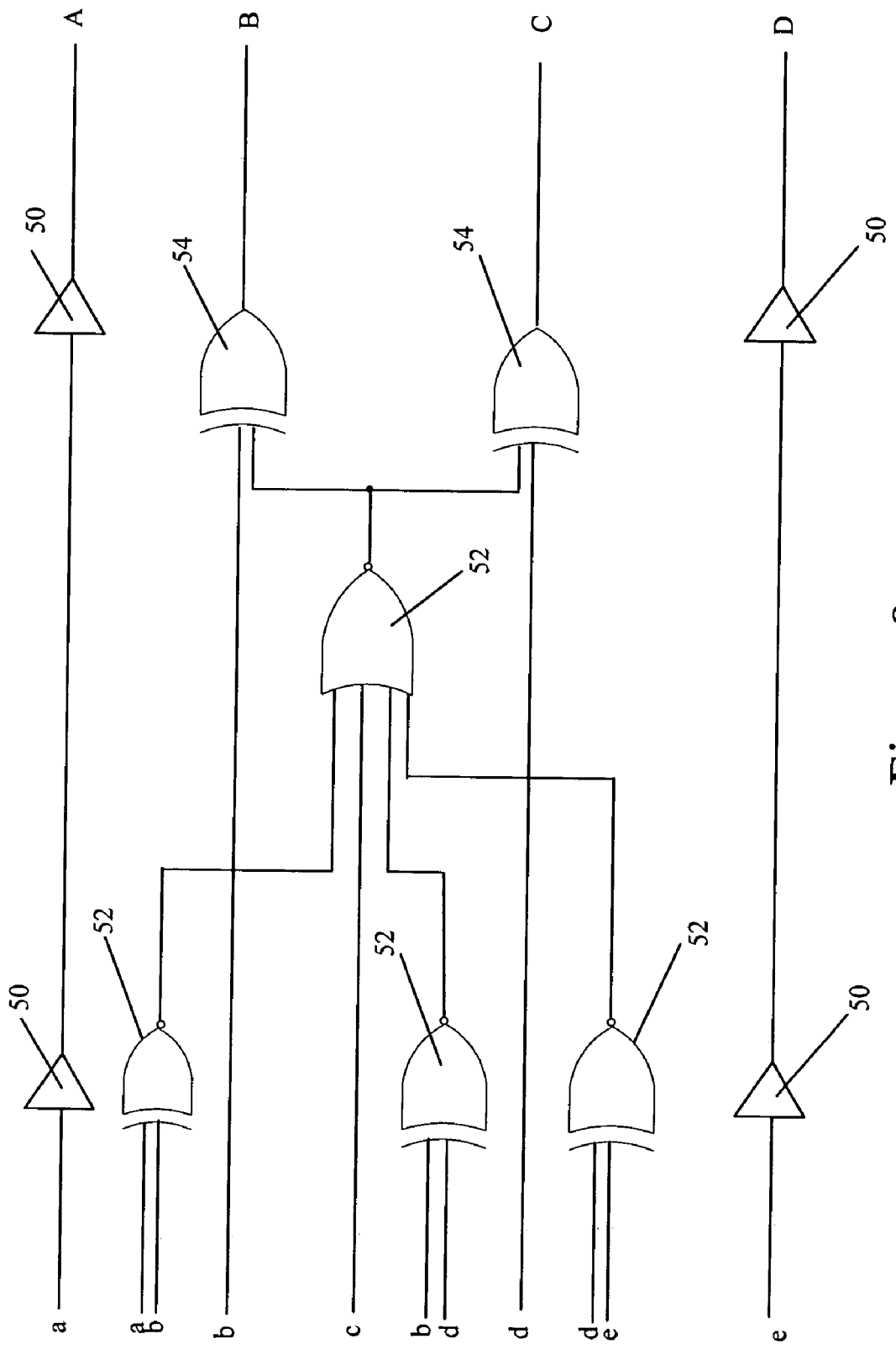
FIG. 8 shows a schematic diagram of circuitry for a decoder for realizing the mapping shown in FIG. 7.

Referring to FIG. 8, there is shown a schematic diagram of circuitry for the decoder 38 for realizing the mapping shown in FIG. 7. The decoder circuitry of FIG. 8 comprises a plurality of buffers 50, a plurality of NOR gates 52, and a plurality of exclusive OR gates 54 for performing the decoding operation in the decoder 38. It should be noted that, as with the buffers 40 in the encoder circuitry of FIG. 6, the buffers 50 in the decoder circuitry of FIG. 8 are provided primarily for matching propagation delay times of other decoder circuitry (i.e., the logic circuitry).

At this point it should be noted that, although the encoder 18 and decoder 38 have been described above as only supporting a spatial run length of two, the present disclosure also contemplates encoders and decoders supporting spatial run lengths of other values. For example, referring to FIG. 9, there is shown a four-bit to five-bit encoder 90 for supporting output bit patterns (codes) having a spatial run length of three (i.e., no more than three spatially adjacent bits in each of the output bit patterns (codes) can be of the same polarity). On the left side of FIG. 9, there is shown a listing of all possible input bit patterns (codes) for a plurality of single ended input signals 92 (i.e., input signals A, B, C, and D). On the right side of FIG. 9, there is shown a listing of all possible output bit patterns (codes) for a plurality of encoded output signals 94 (i.e., encoder output signals a, b, c, d, and e).

Figure 10:
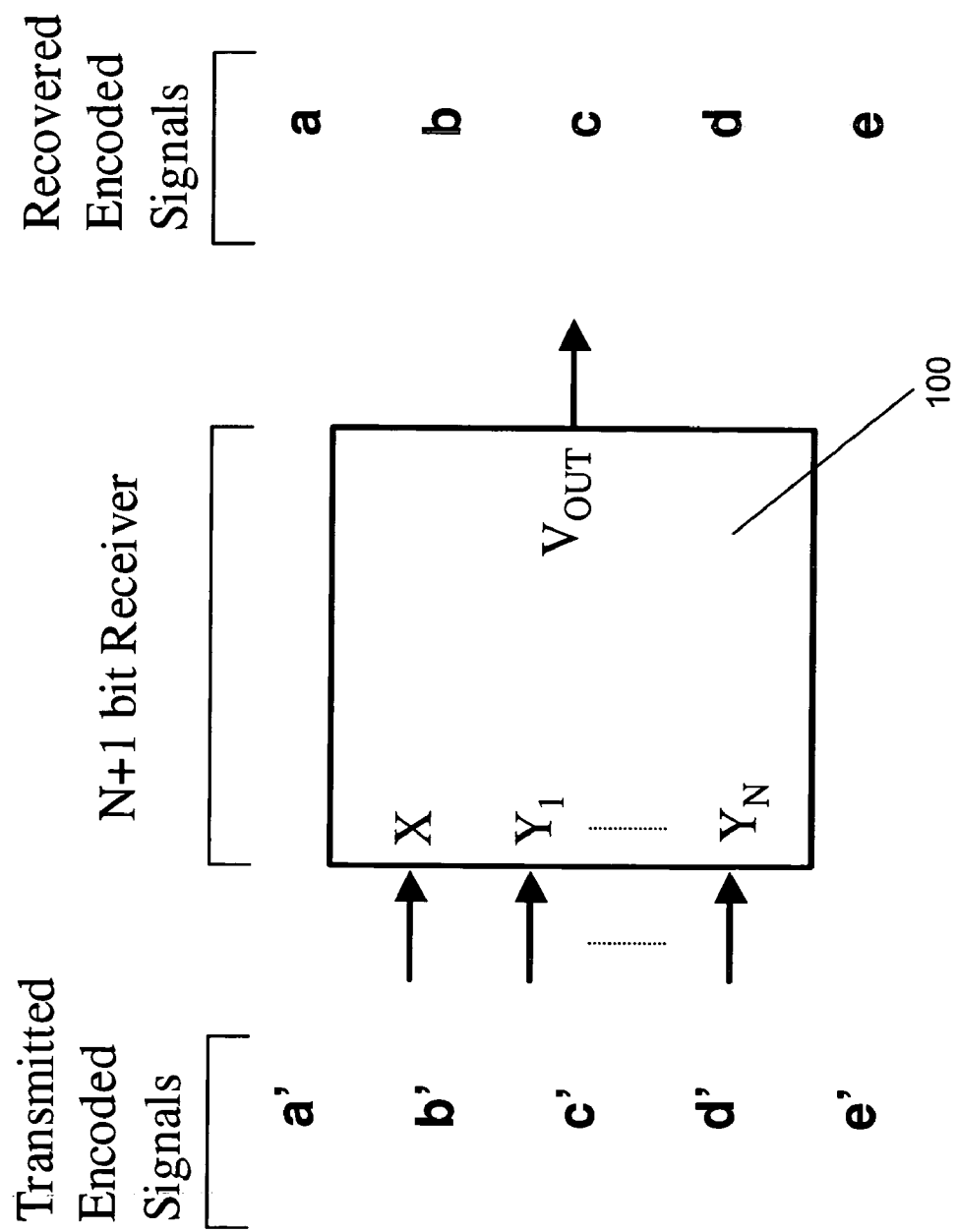
FIG. 10 shows a generic N+1 bit comparator for use in systems employing encoders supporting 5-bit output bit patterns (codes) having a spatial run lengths of N in accordance with the present disclosure.

Since the four-bit to five-bit encoder 90 supports output bit patterns having a spatial run length of three, one or more corresponding comparators supporting output bit patterns having a spatial run length of three are required to recover the plurality of encoded output signals 94 (i.e., encoder output signals a, b, c, d, and e). Referring to FIG. 10, there is shown a generic N+1 bit comparator 100 for use in systems employing encoders supporting 5-bit output bit patterns (codes) having a spatial run lengths of N (i.e., no more than N spatially adjacent bits in each of the bit patterns (codes) can be of the same polarity). For example, in the case of a system employing an encoder supporting a 5-bit output bit pattern (codes) having a spatial run length of two (i.e., no more than two spatially adjacent bits in each of the bit patterns (codes) can be of the same polarity) (e.g., system 10 of FIG. 1),. the comparator 100 is similar to the 3-bit comparator 28 of FIGS. 1 and 3. In the case of a system employing the encoder 90, which supports a 5-bit output bit pattern (codes) having a spatial run length of three (i.e., no more than three spatially adjacent bits in each of the bit patterns (codes) can be of the same polarity), the comparator 100 is a 4-bit comparator. In either case, similar to the comparator 28 of FIG. 1, the signal to be recovered is connected to the "X" input of the comparator 100, and the signal's N spatially adjacent neighbors are connected to inputs "$Y_1$" through "$Y_N$" of the comparator 100.

At this point it should be noted that in the case of a spatial run length (SRL) of two, each signal to be recovered has only one set of two spatially adjacent neighbors. However, in the case of a spatial run length of three, some signals to be recovered have two possible sets of three spatially adjacent neighbors while other signals to be recovered have only one set of three spatially adjacent neighbors. This is illustrated in the table of FIG. 11 for encoder 90 of FIG. 9 and the comparator 100 of FIG. 10. To accommodate the case of a spatial run length of three, the sets of spatially adjacent neighbors assigned to each signal to be recovered are typically predetermined.

At this point it should be noted that, in the case of a spatial run length of N, while it is preferred to have the comparator 100 perform a comparison between the signal to be recovered and N spatially adjacent neighbors of the signal to be recovered, it is also possible to have the comparator 100 perform a comparison between the signal to be recovered and N+Q spatially adjacent neighbors of the signal to be recovered, wherein Q is some integer value. This latter possibility is not preferred since it often adversely affects the signal to noise ratio of the comparator 100. That is, comparing a signal to be recovered with more than N spatially adjacent neighbors of the signal to be recovered will in the best case improve the signal to noise ratio, but in other cases will decrease the signal to noise ratio.

At this point it should be noted that, although only four-bit to five-bit encoders 18 and 90 and a five-bit to four-bit decoder 38 have been described above, the present disclosure also contemplates other-sized encoder and decoder schemes. For example, referring to FIG. 12, there is shown one particular mapping between input patterns (codes) and output patterns (codes) for a four-bit to six-bit encoder 56. On the left side of FIG. 12, there is shown a listing of all possible input bit patterns (codes) for a plurality of single ended input signals 58 (i.e., input signals A, B, C, and D). On the right side of FIG. 12, there is shown a listing of corresponding output bit patterns (codes) for a plurality of encoded output signals 60 (i.e., encoder output signals a, b, c, d, e, and f).

Figure 12:
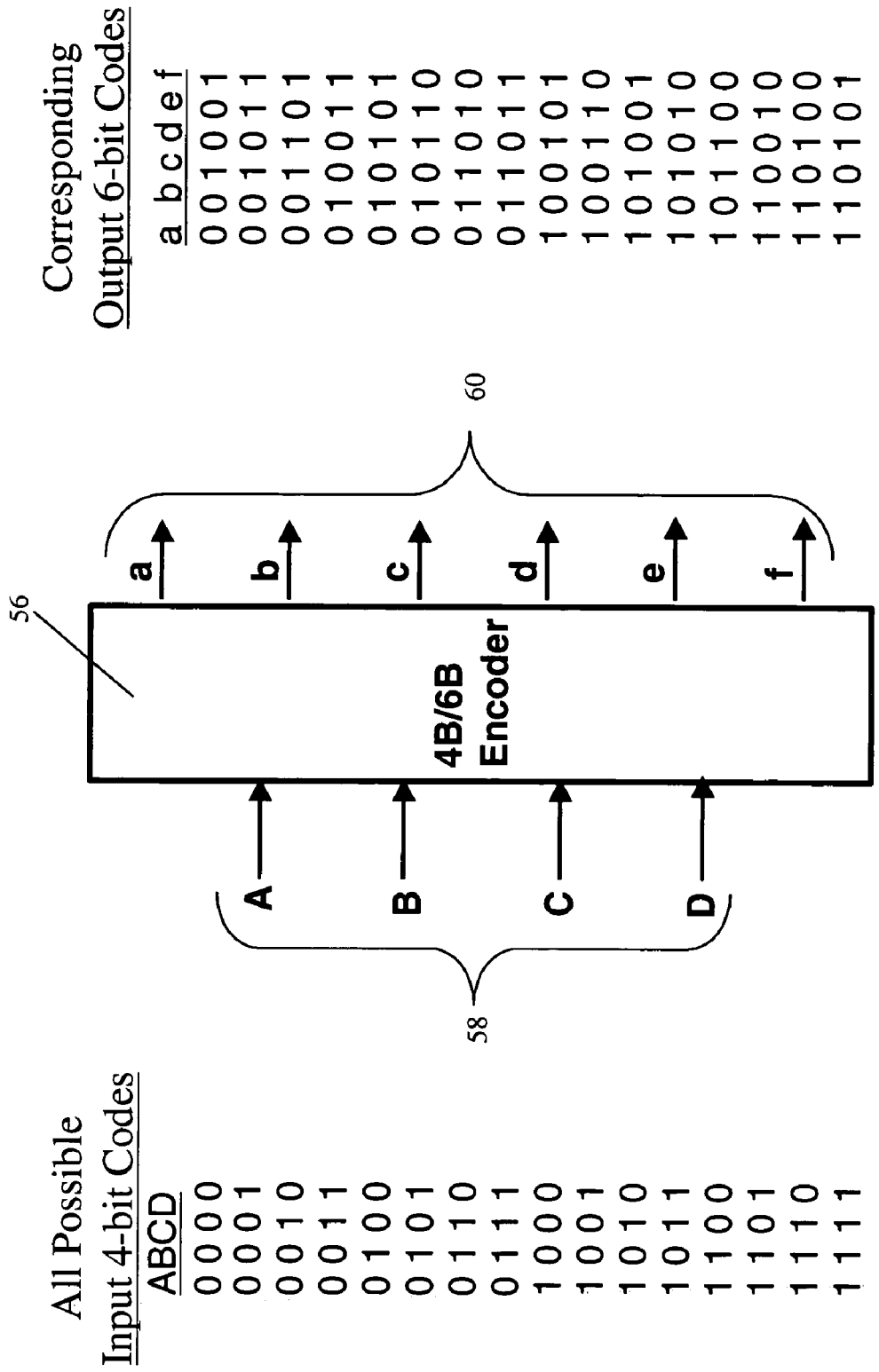
FIG. 12 shows a mapping between input patterns (codes) and output patterns (codes) for a four-bit to six-bit encoder for a spatial run length of two in accordance with the present disclosure.

As with the output bit patterns (codes) of FIGS. 2 and 5, for each of the output bit patterns (codes) of FIG. 12, there are no more than two spatially adjacent bits of the same polarity (all of the output bit patterns (codes) have a spatial run length of two). However, since the encoder 56 generates six-bit output patterns (codes), the encoder 56 may be designed such that all of the output bit patterns (codes) have a spatial run length of three. That is, the encoder 56 may be designed such that no more than three spatially adjacent bits in each of the output bit patterns (codes) can be of the same polarity. Since this adds additional complexity to a corresponding comparator, an encoder design having a spatial run length of two is generally preferred.

Also, it should be noted that the encoder 56 of FIG. 12 is not as efficient as the encoder 18 of FIGS. 2 and 5. That is, the extra encoded output signal (i.e., encoder output signal f in the plurality of encoded output signals 60) requires an additional signal pin on the encoder 56 (and on a corresponding decoder), as well as additional electrically conductive signal path for routing the extra encoded output signal (i.e., encoder output signal f in the plurality of encoded output signals 60) from the encoder 56 to a corresponding decoder.

Figure 9:
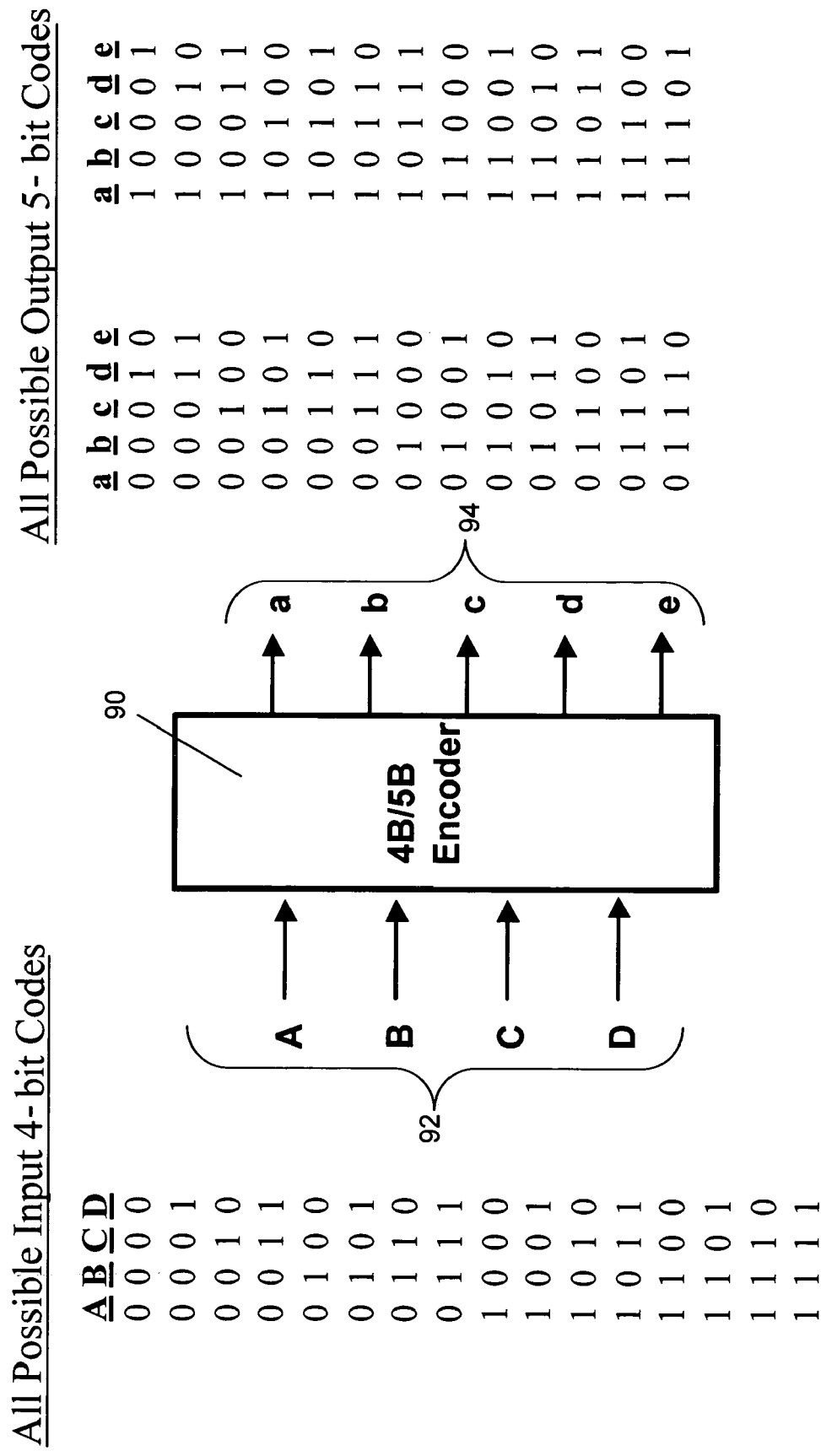
FIG. 9 shows a mapping between input bit patterns (codes) and output bit patterns (codes) for a four-bit to five-bit encoder supporting a spatial run length of three in accordance with the present disclosure.

Despite the above-described additional complexity and comparative inefficiency of the encoder 56 of FIG. 9, it should be noted that the four-bit to six-bit encoder 56 does have one advantage over the four-bit to five-bit encoder 18. That is, the encoder 56 may be designed such that the number of logic zeros and the number of logic ones are substantially equal in each of the output bit patterns (codes). Such an encoding scheme insures that the output drive current in the transmitter including the encoder 56 is substantially constant with respect to time.

At this point it should be noted that an important aspect of the present disclosure technique is that a one half reduction in the input signal voltage at the receiver 14 is achieved. That is, in a single-ended signaling scheme, an input signal is compared against a reference, while in a differential signaling scheme, the input signal is compared against its complement. Consequently, the signal amplitude needed for differential signaling is half of the signal amplitude needed for single-ended signaling. Thus, since the present disclosure technique emulates differential signaling, a one half reduction in the input signal voltage at the receiver 14 is achieved.

Another important aspect of the present disclosure is the use of the present disclosure technique in multilevel signaling systems (i.e., systems utilizing more than two signal levels). That is, it is within the scope of the present disclosure to use the present disclosure technique in multilevel signaling systems, and it would be well within the purview of one skilled in the art to incorporate the teachings herein described into such a multilevel signaling system.

In view of the foregoing, it is apparent that the present disclosure technique allows for an increase in the frequency of operation, and the noise margin, of a chip-to-chip signaling link with only an 1.25× increase in the number of signal pins and some additional logic circuitry (i.e., in the case of a four-bit to five-bit encoding scheme and a five-bit to four-bit decoding scheme). Compared to a 1.5× to 2× increase in the number of signal pins with differential signaling, the present disclosure technique provides a significant benefit.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A transmitter comprising:
an encoder to encode a plurality of input signals so as to generate a plurality of encoded signals having a spatial run length of N, wherein N is an integer having a value of at least two, wherein each encoded signal of the plurality of encoded signals has at least two neighboring encoded signals of the plurality of encoded signals, wherein each encoded signal of the plurality of encoded signals has a different polarity than at least one of its at least two neighboring encoded signals of the plurality of encoded signals.

2. The transmitter of claim 1, further comprising:
a plurality of drivers to drive the plurality of encoded signals onto a transmission medium.

3. The transmitter of claim 2, wherein the plurality of drivers transform the plurality of encoded signals by adjusting a voltage level of at least one of the plurality of encoded signals.

4. The transmitter of claim 2, wherein the plurality of drivers transform the plurality of encoded signals by adjusting a current level of at least one of the plurality of encoded signals.

5. The transmitter of claim 2, wherein the plurality of drivers transform the plurality of encoded signals by adjusting a timing of at least one of the plurality of encoded signals.

6. The transmitter of claim 2, wherein the plurality of encoded signals are transformed in the transmission medium by at least one of: external noise, signal crosstalk, attenuation, and transmission line reflections.

7. The transmitter of claim 6, wherein the transmission medium includes a bus to carry the plurality of encoded signals in close proximity.

8. A receiver comprising:
a decoder to decode a plurality of encoded signals having a spatial run length of N so as to generate a plurality of decoded signals, wherein N is an integer having a value of at least two, wherein each encoded signal of the plurality of encoded signals has at least two neighboring encoded signals of the plurality of encoded signals, wherein each encoded signal of the plurality of encoded signals has a different polarity than at least one of its at least two neighboring encoded signals of the plurality of encoded signals.

9. The receiver of claim 8, further comprising:
a plurality of comparators, each of the plurality of comparators to compare a respective transmitted encoded signal of a plurality of transmitted encoded signals with at least N neighboring transmitted encoded signals of the plurality of transmitted encoded signals so as to generate a respective one of the plurality of encoded signals.

10. The receiver of claim 9, wherein the at least N neighboring transmitted encoded signals of the plurality of transmitted encoded signals are the N neighboring transmitted encoded signals which are nearest in spatial proximity.

11. The receiver of claim 10, wherein no more than N spatially adjacent encoded signals of the plurality of encoded signals are of the same polarity.

12. The receiver of claim 10, further comprising:
a transmission medium to transmit the plurality of transmitted encoded signals to the plurality of comparators.

13. The receiver of claim 12, wherein the plurality of transmitted encoded signals are transformed in the transmission medium by at least one of: external noise, signal crosstalk, attenuation, and transmission line reflections.

14. The receiver of claim 13, wherein the transmission medium includes a bus to carry the plurality of transmitted encoded signals in close proximity.

15. The receiver of claim 9, wherein each of the plurality of comparators includes a M-bit comparator to compare the transmitted encoded signals, wherein M is greater than or equal to N+1.

16. The receiver of claim 15, wherein M equals N+1.

17. The receiver of claim 12, wherein the spatial proximity is measured at at least one of: an encoder, the transmission medium, and the plurality of comparators.

18. The receiver of claim 10, wherein N has a value of two and each of the plurality of comparators compares a respective transmitted encoded signal of the plurality of transmitted encoded signals with two neighboring transmitted encoded signals of the plurality of transmitted encoded signals so as to generate a respective encoded signal of the plurality of encoded signals.

19. The receiver of claim 18, wherein each of the plurality of comparators includes a three-bit comparator to compare a respective transmitted encoded signal of the plurality of transmitted encoded signals with two neighboring transmitted encoded signals of the plurality of transmitted encoded signals so as to generate a respective encoded signal of the plurality of encoded signals.

20. The receiver of claim 19, wherein the two neighboring transmitted encoded signals of the plurality of transmitted encoded signals are the two transmitted encoded signals that are nearest in spatial proximity.

21. An integrated circuit device comprising:
a transmitter comprising:
an encoder to encode a plurality of input signals so as to generate a plurality of encoded signals having a spatial run length of N, wherein N is an integer having a value of at least two, wherein each encoded signal of the plurality of encoded signals has at least two neighboring encoded signals of the plurality of encoded signals, wherein each encoded signal of the plurality of encoded signals has a different polarity than at least one of its at least two neighboring encoded signals of the plurality of encoded signals; and a plurality of drivers to drive the plurality of encoded signals onto a transmission medium; and a receiver comprising a decoder to decode the plurality of encoded signals received from the transmission medium.

22. The integrated circuit device of claim 21, wherein the transmission medium includes a bus to carry the plurality of encoded signals in close proximity, wherein the plurality of encoded signals are transformed in the bus by at least one of: external noise, signal crosstalk, attenuation, and transmission line reflections.

* * * * *